United States Patent
Ballard et al.

(10) Patent No.: US 10,990,680 B2
(45) Date of Patent: Apr. 27, 2021

(54) METHOD AND APPARATUS FOR SECURING ADD-IN CARDS FROM FIRMWARE AND CONFIGURATION CHANGES

(71) Applicant: DELL PRODUCTS, LP, Round Rock, TX (US)

(72) Inventors: Lee E. Ballard, Georgetown, TX (US); Mukund Pushottam Khatri, Austin, TX (US); Jonathan F. Lewis, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 272 days.

(21) Appl. No.: 16/048,001

(22) Filed: Jul. 27, 2018

(65) Prior Publication Data
US 2020/0034541 A1     Jan. 30, 2020

(51) Int. Cl.
| | |
|---|---|
| *G06F 8/65* | (2018.01) |
| *G06F 21/57* | (2013.01) |
| *G06F 11/14* | (2006.01) |
| *G06F 9/4401* | (2018.01) |

(52) U.S. Cl.
CPC .............. *G06F 21/572* (2013.01); *G06F 8/65* (2013.01); *G06F 9/4406* (2013.01); *G06F 11/1441* (2013.01); *G06F 21/575* (2013.01)

(58) Field of Classification Search
CPC .. G06F 21/572; G06F 21/575; G06F 11/1441; G06F 8/65; G06F 9/4406; G06F 11/1433; G06F 8/654
USPC ............................................... 713/1, 2, 100
See application file for complete search history.

(56) References Cited

U.S. PATENT DOCUMENTS

| | | | |
|---|---|---|---|
| 7,730,295 B1 * | 6/2010 | Lee ................ | G06F 9/4401 713/1 |
| 8,702,812 B2 | 4/2014 | Challener et al. | |
| 2009/0094421 A1 * | 4/2009 | Lewis ............ | G06F 21/572 711/154 |
| 2012/0185723 A1 * | 7/2012 | Jaffar ............. | G06F 11/0745 714/5.1 |
| 2013/0132700 A1 * | 5/2013 | Liu ................ | G06F 8/654 711/170 |
| 2014/0283018 A1 | 9/2014 | Dadu et al. | |
| 2015/0355911 A1 * | 12/2015 | Bibb, Jr. ........ | G06F 9/4403 713/2 |

* cited by examiner

*Primary Examiner* — Michael J Brown
(74) *Attorney, Agent, or Firm* — Larson Newman, LLP (57) ABSTRACT

An information handling system includes a memory to store BIOS, a processor, a BMC, and an add-in device. The BMC updates the BIOS in a first system state and prevents BIOS updates in a second system state. The add-in device is configured to update firmware in a first device state and to prevent firmware updates in a second device state. The add-in device enters the first device state when the add-in device receives a power-on reset. The add-in device receives a lockdown command, sets the add-in device to the second device state in response to the lockdown command, and prevents the add-in device from reentering the first device state until the add-in device receives a second power-on reset subsequent to the first power-on reset.

20 Claims, 3 Drawing Sheets

METHOD AND APPARATUS FOR SECURING ADD-IN CARDS FROM FIRMWARE AND CONFIGURATION CHANGES

FIELD OF THE DISCLOSURE

This disclosure generally relates to information handling systems, and more particularly relates to securing add-in cards from firmware and configuration changes.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a memory to store BIOS, a processor, a BMC, and an add-in device. The BMC may update the BIOS in a first system state and prevent BIOS updates in a second system state. The add-in device may update firmware in a first device state and to prevent firmware updates in a second device state. The add-in device may enter the first device state when the add-in device receives a power-on reset. The add-in device may receive a lockdown command, set the add-in device to the second device state in response to the lockdown command, and prevent the add-in device from reentering the first device state until the add-in device receives a second power-on reset subsequent to the first power-on reset.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
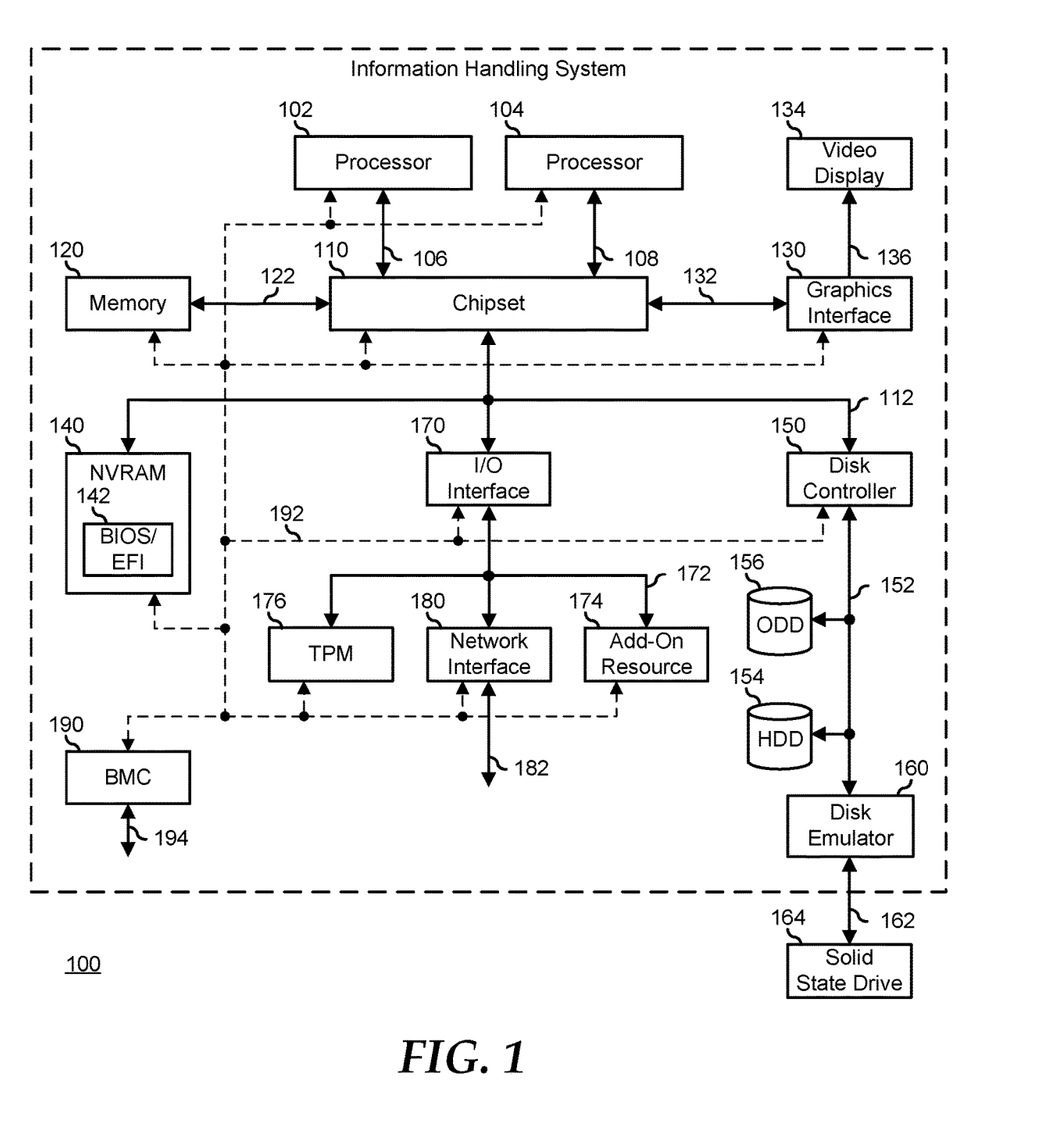
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like.

Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NVRAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. An example of network channel 182 includes an InfiniBand channel, a Fibre Channel channel, a Gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC). Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NVRAM of the device or system that is the subject of the firmware update, thereby replacing the currently operating firmware associated with the device or system, and reboots information handling system, whereupon the device or system utilizes the updated firmware image. BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (e.g., a Web Services Management (WS-MAN) interface, a Management Component Transport Protocol (MCTP) or, a Redfish interface), various vendor defined interfaces (e.g., a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

BMC 190 operates to provide a system lockdown (LD) mode. The system lockdown mode disables the ability to provide particular firmware and configuration changes on information handling system 100. Here, a system administrator directs BMC 190 to set information handling system 100 into the system lockdown mode. For example, when information handling system 100 is configured and updated with the desired firmware updates, the system administrator can invoke the system lockdown mode to prevent inadvertent or malicious changes to the configuration or to the firmware images utilized by the information handling system. In a particular embodiment, when information handling system 100 is in the system lockdown mode, an error message is provided when an attempt is made to make changes to the configuration of to the firmware images. The system lockdown mode is provided based upon code that implements the system BIOS/UEFI and the code utilized by BMC 190. That is, the system lockdown mode is limited to the elements of information handling system 100 over which a manufacturer of the information handling system has complete control. Other elements of information handling system 100 over which the manufacturer does not have complete control may not be affected by the invocation of the system lockdown mode. Here, various third-party devices utilized in information handling system 100 may include applications, tools, or utilities that are invoked in a processing environment hosted by the operating system of the information handling system, that is, that operate in-band. Such third-party devices may therefore be subject to configuration and firmware image changes that are not controlled by BMC 190, and are not disabled by the invocation of the system lockdown mode. Examples of third-party devices which may not be subject to the strictures of the system lockdown mode may include network interface controllers (NICs), storage controllers, add-in memory controllers such as Non-Volatile Memory-Express (NVMe) controllers, and the like. In a particular embodiment, one or more third-party device implements a non-persistent device lockdown mode.

Figure 2:
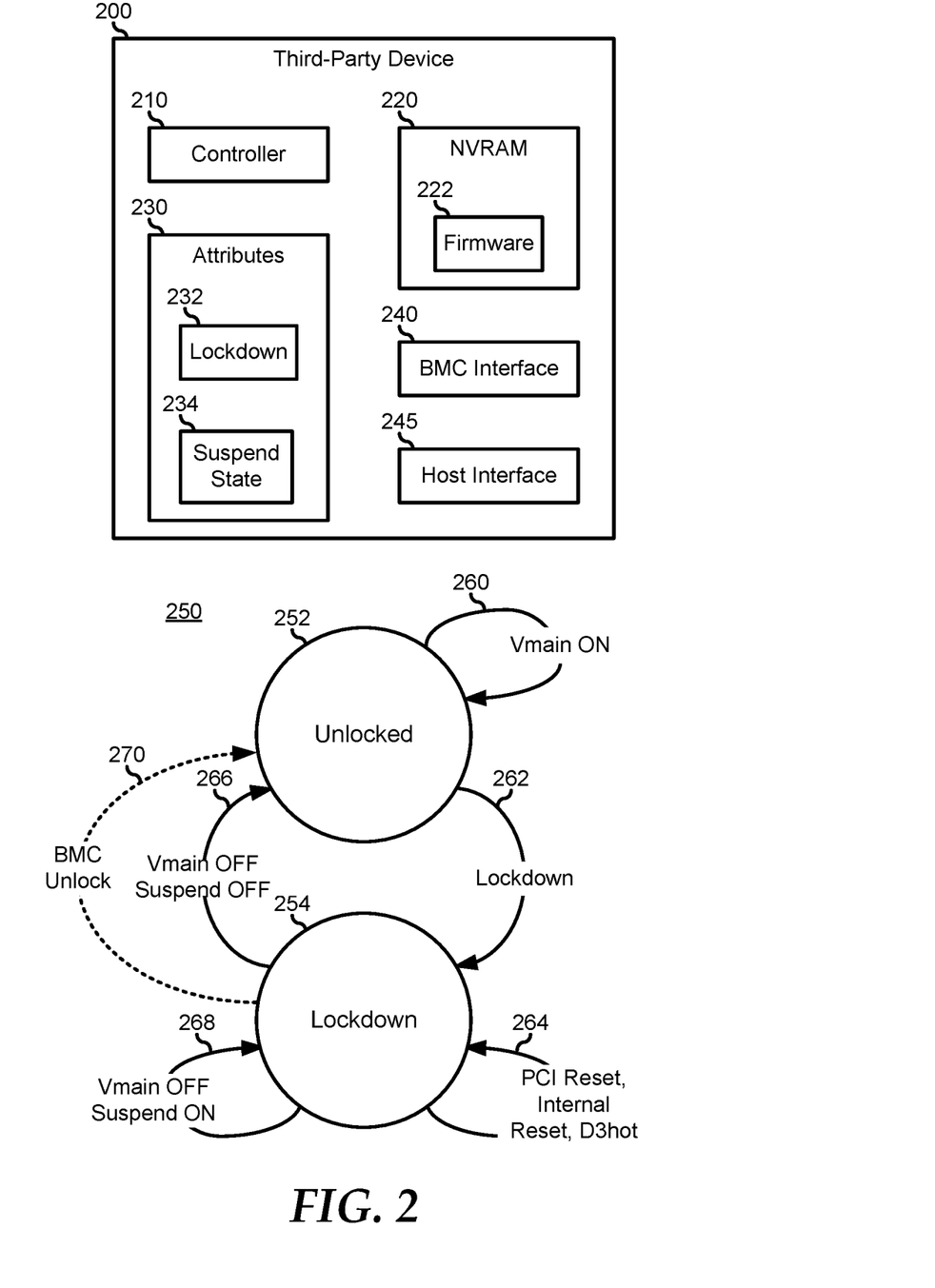
FIG. 2 is a block diagram of a third-party device according to an embodiment of the present disclosure.

FIG. 2 illustrates a third-party device 200 that implements a non-persistent device lockdown mode. Device 200 includes a controller 210, a NVRAM 220, device configuration attributes table 230, a BMC interface 240, and a host interface 245. Controller 210 operates to receive commands from a hosted environment of an information handling system into which device 200 is installed, and to execute the commands to perform a process, procedure, or function of device 200. In executing the commands, controller 210 utilizes firmware 220 stored on NVRAM 220 to direct the actions of the controller to perform the process, procedure, or function of device 200. Further, in executing the commands, controller 210 utilizes device configuration attributes table 230 to specify how the controller performs the process, procedure, or function of device 200.

In a specific example, device 200 can represent a network interface device such as a NIC or a host bus adapter (HBA). Here, controller 210 can receive a command to send a stream of data to a particular network address via a network interface, not shown. Firmware 220 can be utilized by controller 210 to provide procedures for buffering input data, procedures for queuing the input data to the network interface, procedures for establishing a communication path between the network interface and the particular network address, and other procedures, as needed or desired. Device configuration attributes table 230 can be utilized to define various parameters related to buffer sizes, queuing orders, quality-of-service (QOS) handling, network interface setup parameters, and the like, as needed or desired.

In other examples, device 200 can represent a storage controller, a graphics interface controller, a sound/video processing controller, or another type of media controller or adapter, and firmware 220 and device configuration attributes table 230 can provide procedures and functionality suitable to the particular type device. More generally, device 200 can represent any add-in device or card that can be installed into an information handling system via a standardized connector or slot on a printed circuit board of the information handling system. Here, device 200 can be understood to add a unique functionality to the information handling system or to expand the capacity of an existing functionality of the information handling system. Further, device 200 can represent a printed circuit board that includes a connector or slot interface that is compatible with the standardized connector or slot on the printed circuit board of the information handling system, or can represent a separate device that is connected to the standardized connector or slot via a connector cable. In this context, device 200 can also be referred to as an expansion card or board, an adapter card or board, an accessory card or board, a peripheral card or board, or other type of card or board.

It may be understood that device 200 will be set up on system boot to implements various device configuration attributes as found in device configuration attributes table 230, and that controller 210 will utilize a version of firmware 222 as found in NVRAM 220 at the time of system boot. Device configuration attributes table 230 may reside on a memory of device 200, or may be implemented as a set of registers of the device. It will be understood that, as a practical matter, where device configuration attributes table 230 reside on a memory of device 200, NVRAM 220 may further include the device configuration attributes table.

Device 200 provides for various mechanisms for controller 210 to update firmware 222 and to maintain, monitor, and change device configuration attributes 230. For example, various commands received by controller 210 from host interface 250 can be utilized to receive and implement updates to firmware 220 and to change device configuration attributes 230, as needed or desired. Further, device 200 can communicate with a BMC of the information handling system via BMC interface 240 to receive commands utilized by controller 210 to receive and implement updates to firmware 220 and to change device configuration attributes 230, as needed or desired. Device 200 represents a device over which an information handling system manufacturer does not have complete control and may not be affected by the invocation of a system lockdown mode on the information handling system.

However, device 200 implements a non-persistent device lockdown mode. Here, device configuration attributes table 230 includes a lockdown mode attribute 232 and a suspend state attribute 234. Lockdown mode attribute 232 operates, when enabled, to block the ability of controller 210 to update firmware 222 or to change the device configuration attributes table. When device 200 is reset, lockdown mode attribute 232 is disabled, and controller 210 is configured to receive commands from the host environment or the BMC of the information handling system. Then, when controller 210 receives a command to enable lockdown mode attribute 232, device 200 enters the lockdown mode, and remains in the lockdown mode until a next time that the device is reset.

In a particular embodiment, device 200 is constricted as to how lockdown mode attribute 232 is enabled. In a particular case, lockdown mode attribute 232 can only be enabled in response to a command received via BMC interface 240. In another case, lockdown mode attribute 232 can be enabled by a command received from the hosted environment, but is limited as to a timeframe during which the command can be received. In particular, the command may be received from a BIOS or UEFI prior to the invocation of an OS loader. In this way, the control of updates to firmware 222 and to device configuration attributes 230 may be provided only during a pre-OS phase of operation, thereby limiting the ability of the OS to change the firmware or the device configuration attributes. This case reduces the ability of a user of the information handling system to inadvertently or maliciously change firmware 222 or device configuration attributes 230.

In another embodiment, device 200 is constricted as to how the lockdown mode is reset. In particular, when device 200 is in the lockdown mode, it may be desirable to limit the types of resets that can be effective in disabling the lockdown mode. In a particular case, only a full power on reset of device 200 is effective in disabling the lockdown mode, and any other type of reset is ineffective in disabling the lockdown mode. Other types of resets that may be deemed to be ineffective in disabling the lockdown mode include PCI resets or other bus or interface specific resets, reset conditions that are internal to device 200, device based Advanced Configuration and Power Interface (ACPI) power states such as D3, D3hot, D3cold, or the like, or other reset states that are not global in scope for the information handling system.

In the case where an information handling system is placed into a suspend state, such as a suspend-to-RAM (S3) or suspend-to-disk (S4) state, the information handling system may or may not be configured to provide a full power reset on. Here, it may be desirable to provide an indication that the reason for a full power reset is due to the entry to the suspend state, and to therefore maintain device 200 in the lockdown mode. Here, suspend state attribute 234 operates to identify that a particular full power reset is due to a suspend state, and thus device 200 can be maintained in the lockdown mode in spite of the fact that the device experienced a full power reset. In an alternative embodiment, when a BIOS associated with the information handling system detects a resume from a suspend state, the BIOS can provide a command to enable lockdown mode attribute 232 prior to handing control back to the OS. In another embodiment, because a BMC of the information handling system is deemed a secure channel to device 200, a command received on BMC interface 240 operates to set the device into the unlocked mode.

FIG. 2 also illustrates a state diagram 250 of device 200. Here, device 200 starts in an unlocked state 252 and with a main device power in an off state (Vmain OFF). Device 200 remains in the unlocked state 252 while the main device power is provided 260 (Vmain ON). When device 200 receives a lockdown command 262, the device enters a lockdown state 254. Entry to lockdown state 254 upon the receipt of lockdown command 262 may be conditioned upon the source or timing of the lockdown command, as noted above. When in lockdown state 254, device 200 may receive various resets 264, and yet the device remains in the lockdown state. Only when the main device power is in the off state (Vmain OFF) and the information handling system is not in a suspend state (Suspend OFF) 266, does device 200 reenter unlocked state 252. However, if the main device power is in the off state (Vmain OFF) and the information handling system is in a suspend state (Suspend ON) 268, the device remains in lockdown state 254. Finally, a command from the BMC interface to unlock device 200 (BMC Unlock) 270 operates to place the device into unlocked state 252.

Figure 3:
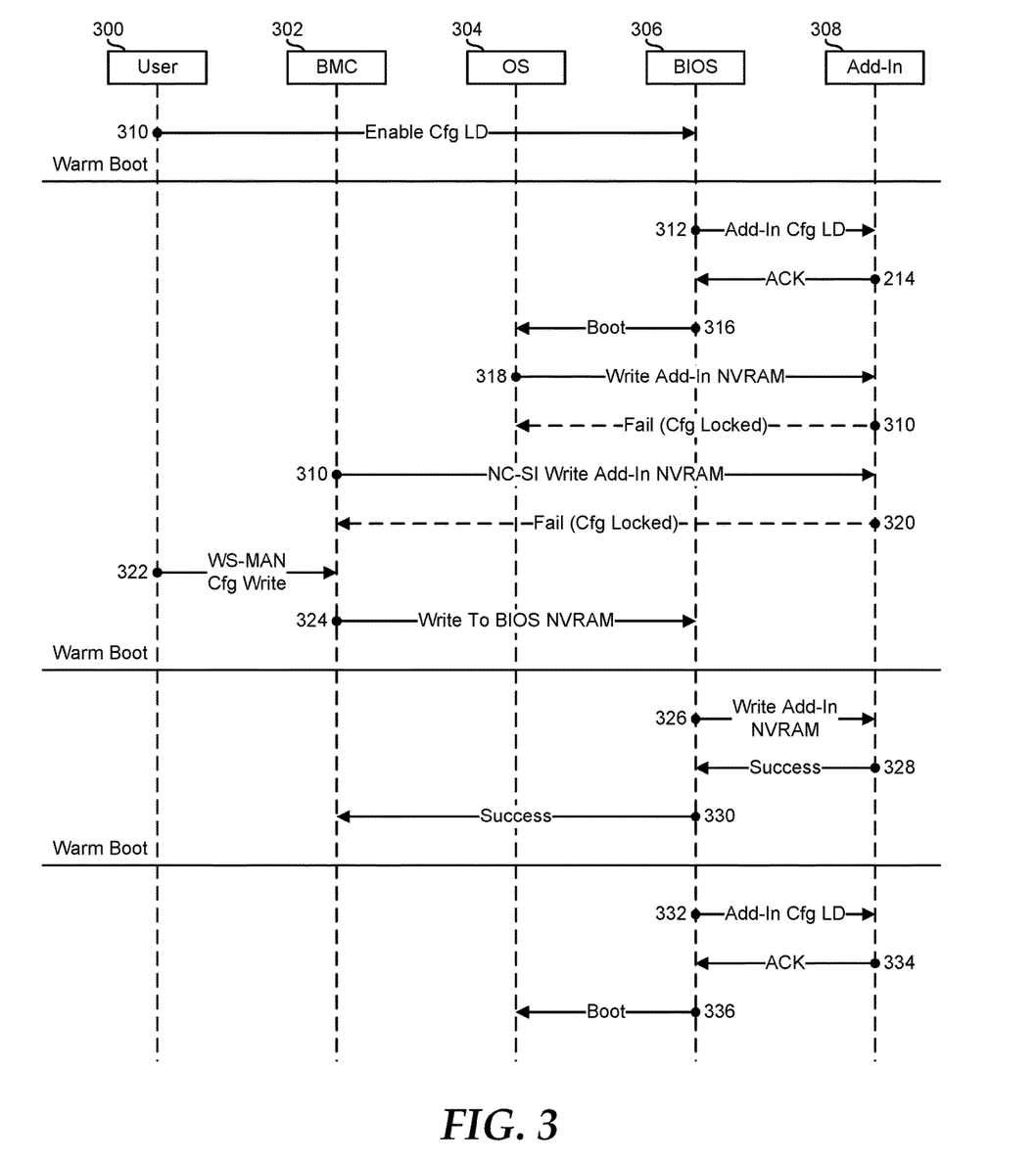
FIG. 3 is a flowchart of a method for securing add-in cards from firmware and configuration changes according to an embodiment of the present disclosure.

FIG. 3 illustrates a method of utilizing a third-party device that implements a non-persistent device lockdown mode, similarly to device 200. Here, an information handling system includes a user 300, a BMC 302, a hosted environment including an OS 304 and a BIOS 306, and a third-party device, illustrated as add-in 308. In a first step 310, user 300 directs BIOS 306 to enable a configuration lockdown mode of the information handling system. The information handling system is booted and in a next step 312, BIOS 306 directs add-in 308 to enable a device lockdown mode. In a next step 314 add-in 308 acknowledges to BIOS 306 that the add-in is in the device lockdown mode, and the BIOS directs OS 304 to boot the OS in step 316.

In step 318, OS 304 attempts a write to a NVRAM of add-in 308 to update a firmware image or to modify a device configuration attribute, but in step 320, the add-in responds to the OS with a fail indication because the add-in is in the lockdown mode. In step 322, BMC 302 attempts a write to a NVRAM of add-in 308 to update a firmware image or to modify a device configuration attribute, but in step 324, the add-in responds to the BMC 302 with a fail indication because the add-in is in the lockdown mode. Here, it can be generalized that any other type of attempt to update a firmware image or to modify a device configuration attribute of add-in 308 will similarly fail because the add-in is in the lockdown mode.

The remainder of the method illustrates how a firmware image of add-in 308 can be updated or a device configuration attribute can be modified, even when the add-in is in the lockdown mode. In step 322, user 300 provides a configuration update, such as via a WS-MAN command, to BMC 302, and the BMC writes the configuration update to an NVRAM of BIOS 306 in step 324. The configuration update remains stored in the NVRAM until the information handling system is rebooted. Then, because the system reboot results in a power-off reset of add-in 308, the add-in becomes susceptible to have a firmware image updated or a device configuration attribute modified. As such, BIOS 306 writes the configuration update to a NVRAM of add-in 308 in step 326. In step 328, add-in 308 indicates that the write of the configuration update to the NVRAM was successful to BIOS 306, and the BIOS indicates that the write of the configuration update to the NVRAM of the add-in was successful to BMC 302 in step 330. The information handling system is rebooted in order to effectuate the configuration update on add-in 308. In step 332, BIOS 306 directs add-in 308 to enable the device lockdown mode. In step 334 add-in 308 acknowledges to BIOS 306 that the add-in is in the device lockdown mode, and the BIOS directs OS 304 to boot the OS in step 336.

It will be understood that where an information handling system includes multiple third-party devices that implement a non-persistent device lockdown mode, that the system BIOS or BMC will need to individually place each third-party device into its own lockdown mode.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a first memory device to store Basic Input/Output System (BIOS) code for the information handling system;
   a processor to execute the BIOS code; and
   an add-in device including a second memory device to store firmware code for the add-in device, the add-in device configured to update the firmware code in the second memory device when the add-in device is in a first device state and to prevent the firmware code from being updated in the second memory device when the add-in device is in a second device state, to receive a first power-on reset, to determine that the first power-on reset is not associated with a suspend state of the information handling system, to enter the first device state when the first power-on reset is not associated with the suspend state, to receive a first lockdown command, to set the add-in device to the second device state in response to the lockdown command, and to prevent the add-in device from reentering the first device state until the add-in device receives a second power-on reset that is not associated with the suspend state.

2. The information handling system of claim 1, wherein the add-in device further includes a first interface to communicate with the processor, and a second interface to communicate with a baseboard management controller (BMC).

3. The information handling system of claim 2, wherein the processor provides the first lockdown command to the add-in device via the first interface.

4. The information handling system of claim 3, wherein the processor is executing the BIOS code when the processor provides the first lockdown command.

5. The information handling system of claim 4, wherein the processor executes the BIOS code to launch an operating system on the information handling system after the processor provides the first lockdown command.

6. The information handling system of claim 2, further comprising:
   the BMC, wherein the BMC is configured to update the BIOS code in the first memory device in a first system state and to prevent the BIOS code from being updated in the first memory device in a second system state, and wherein the BMC provides the first lockdown command to the add-in device via the second interface.

7. The information handling system of claim 6, wherein the BMC provides the first lockdown command to the add-in device before the processor executes the BIOS code to launch an operating system on the information handling system.

8. The information handling system of claim 7, wherein the BMC operates to:
receive an update to the firmware code after the BMC provides the lockdown command to the add-in device;
reboots the information handling system in response to receiving the update, wherein the reboot includes a third power-on reset of the add-in device;
provides the update to the add-in device;
receives an indication from the add-in device that the firmware code was successfully updated in the second memory device;
reboots the information handling system in response to receiving the indication, wherein the reboot includes a fourth power-on reset of the add-in device; and
provides a second lockdown command to the add-in device via the second interface.

9. The information handling system of claim 1, wherein the add-in device is further configured to receive a third power-on reset subsequent to the first power-on reset but prior to the second power in reset, to determine that the third power-on reset is associated with the BIOS suspend state, and to prevent the add-in device from reentering the first device state in response to determining that the third power-on reset is associated with the suspend state.

10. The information handling system of claim 1, wherein the add-in device is further configured to receive a system bus reset subsequent to setting the add-in device into the second state, and to prevent the add-in device from reentering the first device state in response to receiving the system bus reset.

11. A method for securing an add-in device in an information handling system from changes to firmware code for the add-in device, the method comprising:
storing, on a first memory device of the information handling system, Basic Input/Output System (BIOS) code for the information handling system;
storing, on a second memory device of the add-in device, the firmware code;
updating, by a baseboard management controller (BMC) of the information handling system, the BIOS code in the first memory device in a first system state;
preventing, by the BMC, the BIOS code from being updated in the first memory device in a second system state;
updating, by the add-in device, the firmware code in the second memory device when the add-in device is in a first device state;
preventing, by the add-in device, the firmware code from being updated in the second memory device when the add-in device is in a second device state;
receiving, by the add-in device, a first power-on reset;
determining, by the add-in device, that the first power-on reset is not associated with a suspend state of the information handling system;
entering, by the add-in device, the first device state when the first power-on reset is not associated with a suspend state;
receiving, by the add-in device, a first lockdown command;
setting the add-in device to the second device state in response to the lockdown command; and
preventing the reentry of the add-in device to the first device state until the add-in device receives a second power-on reset that is not associated with the suspend state.

12. The method of claim 11, further comprising:
communicating between the add-in device and the processor via a first interface; and
communicating between the add-in device and the BMC via a second interface.

13. The method of claim 12, further comprising:
providing, from the processor, the first lockdown command to the add-in device via the first interface.

14. The method of claim 13, wherein the processor is executing the BIOS code when the processor provides the first lockdown command.

15. The method of claim 14, further comprising:
executing, by the processor, the BIOS code to launch an operating system on the information handling system after the providing the first lockdown command.

16. The method of claim 12, further comprising;
providing, by the BMC, the first lockdown command to the add-in device via the second interface.

17. The method of claim 16, wherein the BMC provides the first lockdown command to the add-in device before the processor executes the BIOS code to launch an operating system on the information handling system.

18. The method of claim 17, further comprising:
receiving, by the BMC, an update to the firmware code after the BMC provides the lockdown command to the add-in device;
rebooting, by the BMC, the information handling system in response to receiving the update, wherein the reboot includes a third power-on reset of the add-in device;
providing, by the BMC, the update to the add-in device;
receiving, by the BMC, an indication from the add-in device that the firmware code was successfully updated in the second memory device;
rebooting, by the BMC, the information handling system in response to receiving the indication, wherein the reboot includes a fourth power-on reset of the add-in device; and
providing, by the BMC, a second lockdown command to the add-in device via the second interface.

19. The method of claim 11, further comprising:
receiving, by the add-in device, a third power-on reset subsequent to the first power-on reset but prior to the second power in reset;
determining, by the add-in device, that the third power-on reset is associated with the BIOS suspend state; and
preventing the add-in device from reentering the first device state in response to determining that the third power-on reset is associated with the suspend state.

20. An add-in device for an information handling system, the add-in device comprising:
a memory to store firmware code for the add-in device; and
a controller configured to update the firmware code when the add-in device is in a first device state and to prevent the firmware code from being updated when the add-in device is in a second device state, to receive a first power-on reset, to determine that the first power-on reset is not associated with a suspend state of the information handling system, to enter the first device state when the first power-on reset is not associated with the suspend state, to receive a lockdown command, to set the add-in device to the second device state in response to the lockdown command, and to prevent the add-in device from reentering the first device state until the add-in device receives a second power-on reset that is not associated with the suspend state.

* * * * *